United States Patent
Twede et al.

(10) Patent No.: US 9,426,401 B2
(45) Date of Patent: Aug. 23, 2016

(54) MECHANISMS FOR OBTAINING INFORMATION FROM A SCENE

(71) Applicant: Lockheed Martin Corporation, Bethesda, MD (US)

(72) Inventors: David R. Twede, Orlando, FL (US); Robert R. Muise, Oviedo, FL (US); Del E. Vicker, Orlando, FL (US); Gary Vanstone, Merritt Island, FL (US)

(73) Assignee: Lockheed Martin Corporation, Bethesda, MD (US)

( * ) Notice: Subject to any disclaimer, the term of this patent is extended or adjusted under 35 U.S.C. 154(b) by 308 days.

(21) Appl. No.: 13/951,690

(22) Filed: Jul. 26, 2013

(65) Prior Publication Data
US 2014/0027616 A1    Jan. 30, 2014

Related U.S. Application Data

(60) Provisional application No. 61/676,229, filed on Jul. 26, 2012.

(51) Int. Cl.
| | |
|---|---|
| *H03K 17/78* | (2006.01) |
| *H01J 40/14* | (2006.01) |
| *H01L 27/00* | (2006.01) |
| *H01J 3/14* | (2006.01) |
| *H04N 5/378* | (2011.01) |
| *H04N 5/335* | (2011.01) |
| *H04N 9/04* | (2006.01) |

(52) U.S. Cl.
CPC .............. *H04N 5/378* (2013.01); *H04N 5/335* (2013.01); *H04N 9/045* (2013.01)

(58) Field of Classification Search
CPC ....... G02B 5/20; H03K 17/941; G01N 21/27
USPC ........ 250/214 DC, 214 R, 208.1, 214.1, 216, 250/225, 226; 359/196.1, 204.1, 204.3, 359/204.4, 483.01, 485.01, 486.01, 487.01, 359/515, 831, 838, 885; 348/36, 294–324; 257/291, 292, 431–466
See application file for complete search history.

(56) References Cited

U.S. PATENT DOCUMENTS

2013/0208082 A1*  8/2013  Williams et al. ............... 348/36

OTHER PUBLICATIONS

Author Unknown, "An Introduction to Hyperspectral Imaging Technology," Space Computer Corporation, 2006, Los Angeles, California, 36 pages.

* cited by examiner

*Primary Examiner* — Pascal M Bui Pho
(74) *Attorney, Agent, or Firm* — Withrow & Terranova, PLLC (57) ABSTRACT

A method and device for obtaining information from a scene. A beam of photons associated with a scene is separated into a plurality of photon sub-beams. At least two photon sub-beams are optically encoded to generate at least two corresponding encoded photon sub-beams. Each encoded photon sub-beam is encoded based on a corresponding encoding function. The encoded photon sub-beams are combined to generate a combined photon beam. A detection device detects the combined photon beam to generate image data. The image data is decoded based on the plurality of encoding functions to generate a plurality of sub-images. Each sub-image corresponds to one of the at least two photon sub-beams of the plurality of photon sub-beams.

16 Claims, 8 Drawing Sheets

MECHANISMS FOR OBTAINING INFORMATION FROM A SCENE

RELATED APPLICATIONS

This application claims the benefit of provisional patent application Ser. No. 61/676,229, filed Jul. 26, 2012, entitled "Multi-modal Multiplexing Imaging," the disclosure of which is hereby incorporated herein by reference in its entirety.

TECHNICAL FIELD

The embodiments relate generally to identifying information in a scene, and in particular to mechanisms for separating a beam of photons into multiple sub-beams based on an attribute of the photons, and simultaneously imaging the multiple sub-beams with a detection device in real-time.

BACKGROUND

An image sensor, such as a charge-coupled device (CCD) or focal plane array (FPA), converts photons received from a scene into electrons. The electrons can be used to generate an image of the scene. The electrons do not directly identify particular attributes of the sensed photons, such as wavelength, polarization, or phase. Such attributes may be useful in a variety of different applications, including, for example, in applications where the image is analyzed to identify objects in the scene because information such as wavelength, polarization, and phase may help properly identify objects in the scene.

Color information in a conventional digital camera is determined by allowing only photons of certain wavelengths to be passed to particular sensing elements of the image sensor, typically through the use of a color filter array (CFA), such as a Bayer filter, or the like. A CFA, however, allows for the determination of only a finite number of colors from a scene, typically three colors, and does not facilitate the identification of other attributes of photons that may be useful, such as polarization or phase. Multiple different cameras with different CFAs could be used simultaneously to capture different wavelength information, but such an arrangement increases costs and complexity.

SUMMARY

The embodiments relate to mechanisms for separating a beam of photons into multiple photon sub-beams based on an attribute of the photons, encoding the multiple photon sub-beams, optically combining the multiple photon sub-beams into a combined photon beam, and simultaneously imaging the encoded photon sub-beams with a detection device in real-time. In one embodiment, a method is provided wherein a beam of photons associated with a scene is separated into a plurality of photon sub-beams based on an attribute of the photons. The attribute of the photons used for separation may comprise, for example, a wavelength attribute, a phase attribute, or a polarization attribute. Thus, each photon sub-beam may comprise a different wavelength or wavelength band, a different phase or phase band, or a different polarization or polarization band.

At least two photon sub-beams are optically encoded to generate at least two corresponding encoded photon sub-beams based on corresponding encoding functions. In one embodiment, each encoding function alters phase and/or magnitude attributes of the photon sub-beams in a manner that can subsequently be decoded based on the particular encoding function. Each encoding function differs. In one embodiment, the at least two photon sub-beams are encoded by passing the at least two photon sub-beams through respective optically filtering patterns that correspond to the respective encoding functions to alter phase and/or magnitude attributes of the at least two-photon sub-beams based on the respective encoding functions.

The encoded photon sub-beams are optically combined to generate a combined photon beam. In one embodiment, the encoded photon sub-beams are optically combined by focusing the encoded photon sub-beams onto a dispersive element, such as a re-compress element. The combined photon beam is then detected with a detection device, such as a charge-coupled device (CCD), focal plane array (FPA), or the like. The detection device generates image data based on the detected combined photon beam. The image data is decoded based on the corresponding encoding functions to generate sub-images, each sub-image corresponding to one of the at least two photon sub-beams.

In another embodiment, a device is provided. The device includes a photon beam separator that is configured to separate a beam of photons associated with a scene into a plurality of photon sub-beams based on an attribute of the photons. The device also includes an optical encoder that is configured to optically encode at least two photon sub-beams of the plurality of photon sub-beams to generate at least two corresponding encoded photon sub-beams. Each encoded photon sub-beam is encoded based on a corresponding encoding function. The device further includes an optical combiner that is configured to optically combine the encoded photon sub-beams to generate a combined photon beam. A detector is configured to detect the combined photon beam and, based on the detected combined photon beam, generate image data. A decoder is configured to decode the image data based on the plurality encoding functions to generate a plurality of sub-images. Each sub-image corresponds to one of the at least two photon sub-beams.

Those skilled in the art will appreciate the scope of the present disclosure and realize additional aspects thereof after reading the following detailed description of the preferred embodiments in association with the accompanying drawing figures.

BRIEF DESCRIPTION OF THE DRAWINGS

The accompanying drawing figures incorporated in and forming a part of this specification illustrate several aspects of the disclosure, and together with the description serve to explain the principles of the disclosure.

DETAILED DESCRIPTION

The embodiments set forth below represent the necessary information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

Figure 1:
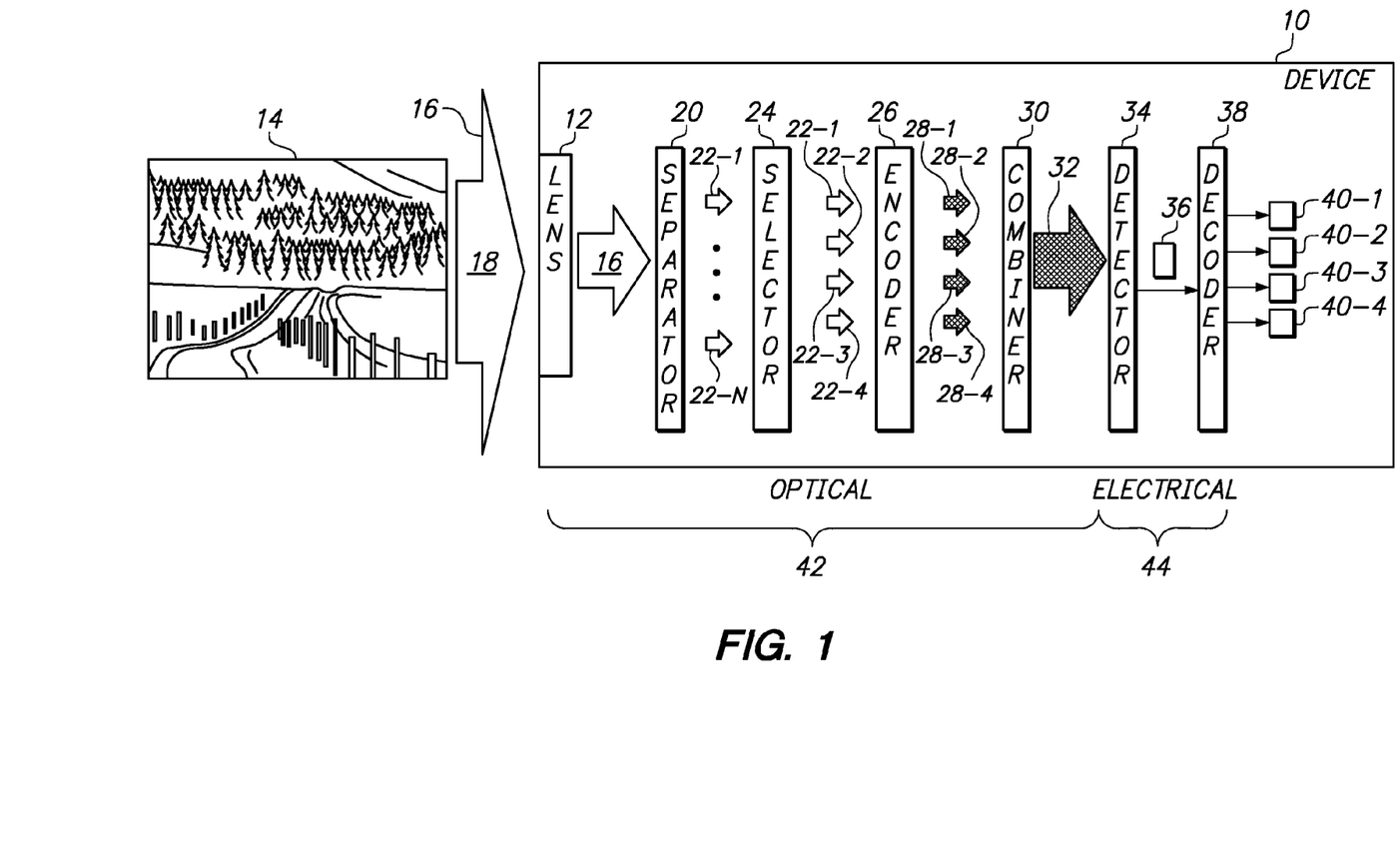
FIG. 1 is a functional block diagram of a device in which embodiments may be practiced.

The embodiments relate to mechanisms for separating a beam of photons into multiple photon sub-beams based on an attribute of the photons, encoding the multiple photon sub-beams, and simultaneously imaging the encoded sub-beams with a detection device in real-time. FIG. 1 is a functional block diagram of a device 10 in which embodiments may be practiced. The device 10 includes one or more lenses 12 that receive information from a scene 14. The extent of the scene 14 may be affected by a number of factors associated with the device 10, such as an aperture, a field-of-view, a focal length of the one or more lenses 12, and other characteristics of the one or more lenses 12 or other components of the device 10. In some embodiments, the device 10 may be utilized in a moving platform, such as an aircraft, and the scene 14 may be continually changing over time.

The information received by the device 10 from the scene 14 is in the form of electromagnetic radiation, and, in particular, in the form of a photon beam 16. The photon beam 16 comprises a plurality of photons 18 that may have a variety of different attributes, including different wavelength attributes, different phase attributes, different polarization attributes, and the like. The phrase "beam" as used herein refers to a stream of the photons 18 that are received for a period of time. The period of time may be relatively long, such as minutes, hours, or days, or may be relatively short, such as seconds, milliseconds, or fractions of milliseconds, as may be controlled by a component of the device 10, such as a shutter.

The lens 12 relays the photon beam 16 to a photon beam separator 20 that is configured to separate the photon beam 16 associated with the scene 14 into a plurality of photon sub-beams 22-1-22-N (generally, photon sub-beams 22) based on an attribute of the photons 18.

The attributes used to separate the photon beam 16 may comprise any attribute of a photon 18 that is of interest for the desired purpose, including, for example, a wavelength attribute, a phase attribute, or a polarization attribute. Information such as photon wavelength, photon phase, and/or photon polarization may be useful in a variety of contexts, including, for example, the identification of objects in the scene 14. While for purposes of illustration the embodiments disclosed herein will generally be discussed in the context of separating the photon beam 16 based on wavelength, the embodiments are not limited to separation based on wavelength, or limited to the separation of the photon beam 16 based on a single photon attribute. The photon beam separator 20 may comprise, for example, a dichroic spectral splitter, a field angle pupil optic, a wavelength beamsplitter, a phase beamsplitter, a polarization beamsplitter, a dispersive element, a pattern encoding optic, a pattern bandpass filter, a pattern polarization filter, a pattern phase shift filter, a color-axial lens, a binary optic lens, a kinoform lens, or any other element suitable for separating the photon beam 16 into the photon sub-beams 22 as desired for the particular application. Separation may include a separation of the attribute or attributes in directions co-aligned (i.e., along) the optical axis or transverse (i.e., orthogonal) to the propagation axis. The photon beam separator 20 may reside, in some embodiments, in a focal plane of the lens 12, a pupil plane, or an image plane.

In some embodiments, the device 10 may generate groups of photon sub-beams 22 that are separated based on different attributes. For example, the photon beam 16 may be separated into a first group of photon sub-beams 22 based on a phase attribute, such that each photon sub-beam 22 in the first group has a different phase, or band of phases, than every other photon sub-beam 22 in the first group. The photon beam 16, or an immediately successively received photon beam 16, may also be separated into a second group of photon sub-beams 22 based on a wavelength attribute, such that each photon sub-beam 22 in the second group has a different wavelength, or band of wavelengths, than every other photon sub-beam 22 in the second group. The photon beam 16, or an immediately successively received photon beam 16, may also be separated into a third group of photon sub-beams 22 based on a polarization attribute, such that each photon sub-beam 22 in the third group has a different polarization, or band of polarizations, than every other photon sub-beam 22 in the third group.

In one embodiment, the photon sub-beams 22 are directed toward a photon selector 24 that may select one or more of the photon sub-beams 22 from the plurality of photon sub-beams 22 based on the photon attribute, such as wavelength, phase, or polarization, used to generate the photon sub-beams 22. For example, solely for purposes of illustration, assume that the photon sub-beams 22 are generated based on wavelength, and that each photon sub-beam 22 comprises photons 18 of a particular band, or range, of wavelengths. The photon selector 24 may select photon sub-beams 22-1-22-4 from the photon sub-beams 22, and may discard, or otherwise block, the remainder of the photon sub-beams 22. This may be desirable because the photon sub-beams 22-1-22-4 may comprise photons of particular wavelengths of interest for a specific application, and the remainder of the photon sub-beams 22 may not be useful in the specific application. In one embodiment, the photon selector 24 may comprise, for example, a spectral optical filter that passes photon sub-beams 22 of interest and blocks photon sub-beams 22 not of interest.

The photon sub-beams 22-1-22-4 are directed toward an optical encoder 26 (hereinafter, encoder 26) that is configured to optically encode the photon sub-beams 22-1-22-4 to generate corresponding encoded photon sub-beams 28-1-28-4 (generally, encoded photon sub-beams 28), such that the encoded photon sub-beam 28-1 corresponds to the photon sub-beam 22-1, the encoded photon sub-beam 28-2 corresponds to the photon sub-beam 22-2, the encoded photon sub-beam 28-3 corresponds to the photon sub-beam 22-3, and the encoded photon sub-beam 28-4 corresponds to the photon sub-beam 22-4. The encoder 26 encodes the encoded photon sub-beams 28-1-28-4 based on corresponding encoding functions. Each encoding function used to encode the encoded photon sub-beams 28-1-28-4 differs from one another.

In one embodiment the encoded photon sub-beams 28-1-28-4 are simultaneously optically encoded by passing the photon sub-beams 22-1-22-4 through respective optically filtering patterns that correspond to the respective encoding functions. The optically filtering patterns may alter at least one of magnitude and phase of the photon sub-beams 22-1-22-4 in accordance with the respective encoding function. Thus, after being encoded, for example, the encoded photon sub-beam 28-1 may have phases and/or magnitudes that differ from the phases and/or magnitudes of the photon sub-beam 22-1 in accordance with a particular encoding function, and the encoded photon sub-beam 28-2 may have phases and/or magnitudes that differ from the phases and/or magnitudes of the photon sub-beam 22-2 in accordance with a different encoding function. The photon selector 24 and encoder 26 may comprise one or more elements. In one embodiment, a single element, such as a spatial-light modulator (SLM) performs both the selection function and the encoding function.

Any suitable element that is capable of modulating the magnitude (i.e., electric field strength) and/or the phase (i.e., electric field phase angle) of a photon may be used. Example suitable elements include an aperture mask with opaque and transmissive regions in a pattern (e.g., a fixed SLM) or with pattern optical path length variations (i.e., altering phase). The latter are sometimes referred to as phased-array optics, and can be SLMs, holographic elements, etched glass, nanotechnology elements, and the like.

The encoded photon sub-beams 28 are directed to an optical combiner 30 (hereinafter, combiner 30) that is configured to optically combine, or multiplex, the encoded photon sub-beams 28 to generate a combined photon beam 32. The combiner 30 may comprise, for example, a single element or multiple elements, such as one or more lenses that focus the encoded photon sub-beams 28 onto a re-compress grating.

In embodiments where the separation/encoding functions occur at the pupil, Fourier, or other non-imaging plane, then the combiner 30 may comprise a lens that multiplexes or combines the separated encoded photon sub-beams 28 into the combined photon beam 32 through the relay process at the image plane. If the separation/encoding functions happen at the image plane, then the combiner 30 may comprise, for example, a phased array element, micro-prism array, holographic element, or the like.

The combined photon beam 32 comprises the encoded photon sub-beams 28, and is directed to a detector 34. The detector 34 may comprise any suitable detection device, such as a charge-coupled device (CCD) sensor, focal plane array (FPA) sensor, complementary metal-oxide-semiconductor (CMOS) sensor, suitable for detecting the photons 18 in the combined photon beam 32. Thus, in some applications where the photons 18 of interest comprise photons in the visible spectrum, the detector 34 may comprise a CCD or CMOS sensor. In other applications, wherein the photons 18 of interest comprise photons in the infrared spectrum, the detector 34 may comprise a FPA sensor of appropriate material sensitive to the infrared spectrum of interest. Other applications may utilize photons 18 in spectrums other than the infrared and visible, and the detector 34 may comprise a sensor having sensor elements sensitive to the desired wavelengths of interest.

The detector 34 simultaneously detects each of the encoded photon sub-beams 28 in the combined photon beam 32, and based on the combined photon beam 32, generates image data 36. The image data 36, for example, may correspond to the electrical charge associated with each pixel, or sensor, in the sensor array of the detector 34. A decoder 38 decodes the image data 36 based on the plurality of encoding functions used to encode the encoded photon sub-beams 28 to generate a plurality of sub-images 40-1-40-4 (generally, "sub-images 40"). The sub-images 40-1-40-4 correspond to the photon sub-beams 22-1-22-4. In particular, the sub-image 40-1 comprises an image of the photons 18 in the photon sub-beam 22-1, the sub-image 40-2 comprises an image of the photons 18 in the photon sub-beam 22-2, the sub-image 40-3 comprises an image of the photons 18 in the photon sub-beam 22-3, and the sub-image 40-4 comprises an image of the photons 18 in the photon sub-beam 22-4.

Notably, the process described with respect to the separation, selection, encoding, and combining of the photon beam 16 all happens in an optical domain 42, and thus happens in real-time without a need to convert the photons 18 to the electrical domain. The processing downstream of the detector 34 may occur in an electrical domain 44.

Figure 2:
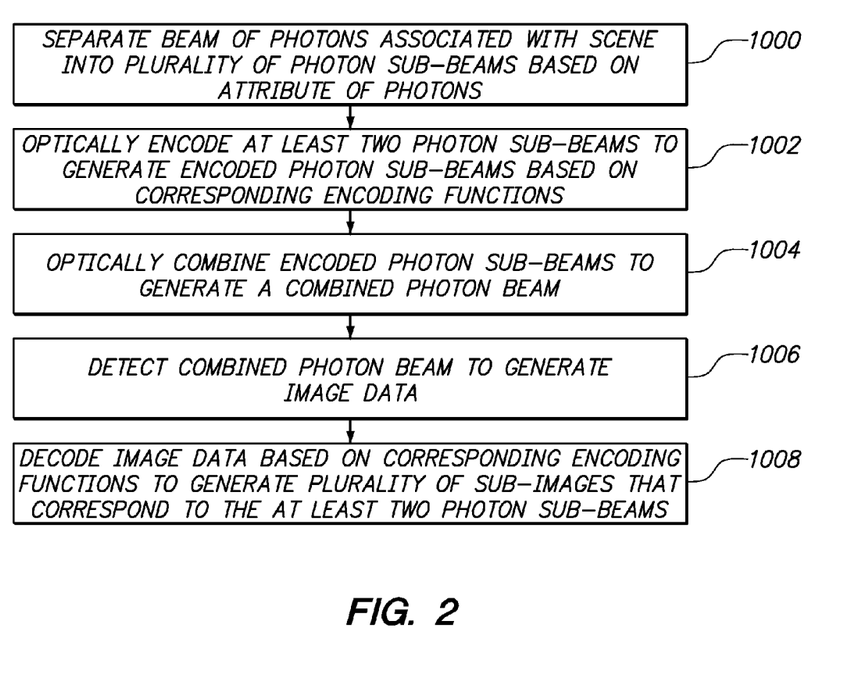
FIG. 2 is a flowchart of a method for obtaining information from a scene according to one embodiment.

FIG. 2 is a flowchart of a method for obtaining information from a scene according to one embodiment, and will be discussed in conjunction with FIG. 1. The device 10 receives information in the form of the photon beam 16 from the scene 14. The device 10 separates the photon beam 16 associated with the scene 14 into the plurality of photon sub-beams 22 (FIG. 2, block 1000). Assume for purposes of illustration only, that the photon beam 16 is separated based on a wavelength attribute of the photons 18, and thus each photon sub-beam 22 comprises photons 18 of a particular wavelength, or photons 18 within a particular band of wavelengths. The device 10 optically encodes at least two photon sub-beams 22 to generate at least two corresponding encoded photon sub-beams 28 based on corresponding encoding functions (FIG. 2, block 1002). In one embodiment, the encoding functions comprise different point spread functions. The device 10 optically combines the at least two corresponding encoded photon sub-beams 28 to generate the combined photon beam 32 (FIG. 2, block 1004). The device 10 detects the combined photon beam 32 and, based on the detected combined photon beam 32, generates the image data 36 (FIG. 2, block 1006). The device 10 decodes the image data 36 based on the corresponding encoding functions to generate a plurality of sub-images 40 (FIG. 2, block 1008).

Figure 3A:
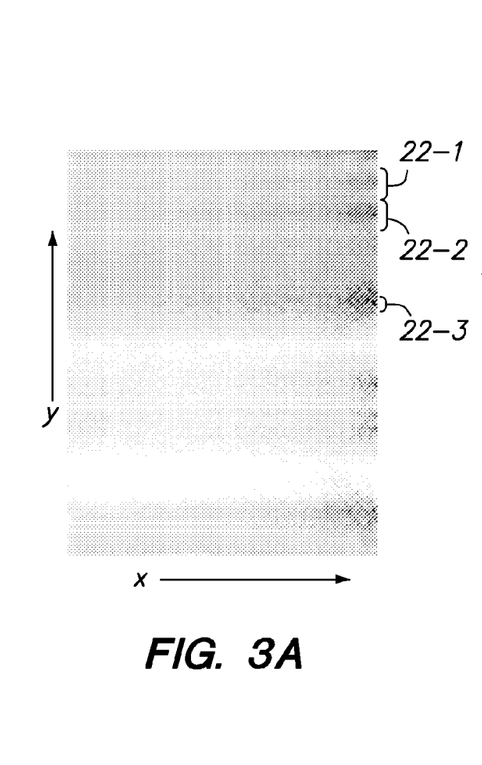
FIGS. 3A-3C are block diagrams illustrating optical encoding of photon sub-beams according to one embodiment.
Figure 3B:
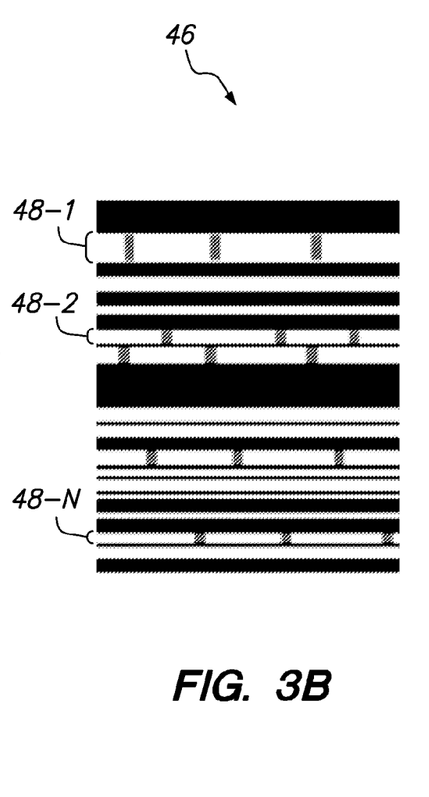
Figure 3C:
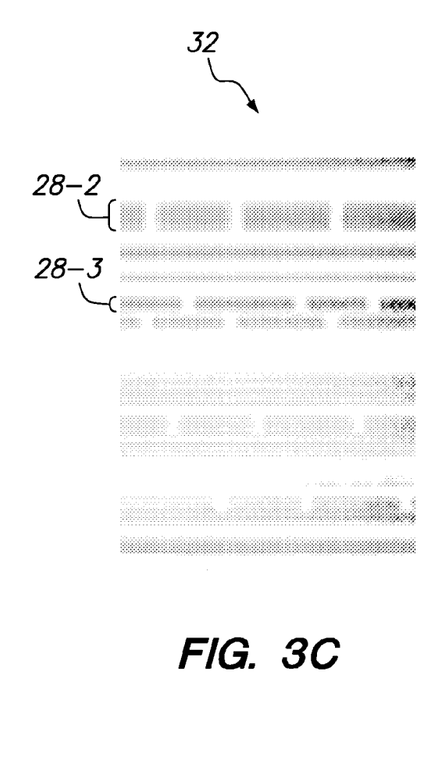

FIGS. 3A-3C are diagrams illustrating optical encoding of the photon sub-beams 22 according to one embodiment. FIG. 3A illustrates an example dispersion pattern of the photon beam 16 such that the photons 18 are separated into a plurality of photon sub-beams 22 based on wavelength, as illustrated along the Y-axis. While for purposes of illustration, only three photon sub-beams 22-1-22-3 are explicitly labeled, it is apparent that the photon beam 16 may be separated into as many photon sub-beams 22 as desired or appropriate.

Referring now to FIG. 3B, an example optical mask 46 comprising a plurality of optically filtering patterns 48-1-48-N (generally, "optically filtering patterns 48") is illustrated. Each optical filtering pattern 48 optically encodes a corresponding photon sub-beam 22 in accordance with an encoding function. The optical filtering patterns 48 may alter magnitude and/or phases of the photon sub-beams 22 based on the corresponding encoding function. In one embodiment, the optical mask 46 may be generated via a SLM, and the SLM may store a plurality of optical masks 46, any one of which may be selected for use based on a particular mission or purpose. The encoding function may be based on any desired optical transform function, such as a magnitude or phase pattern, including, by way of non-limiting example, a point spread function, or the like. The optical mask 46 may block, or otherwise discard, certain photon sub-beams 22, such as the photon sub-beam 22-1.

FIG. 3C conceptually illustrates an example combined photon beam 32 after selected photon sub-beams 22 have been optically encoded by the optical mask 46 to form, for example, encoded photon sub-beams 28-2 and 28-3.

Figure 4:
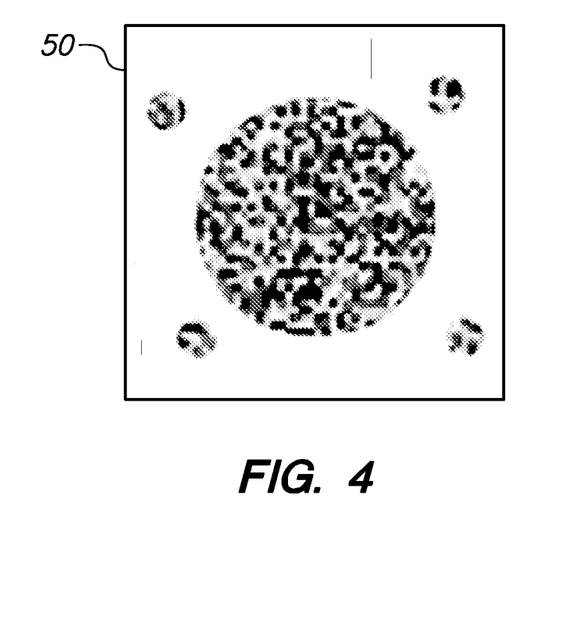
FIG. 4 illustrates an example optical mask according to one embodiment.

FIG. 4 illustrates an example optical mask 50 according to another embodiment. In this embodiment, the optical mask 50 optically filtering encoding pattern illustrates white space as a principle wavelength band, and the outer edges of the example optical mask 50 transmit high spatial frequencies for optimized resolution. The other seven wavelength bands (illustrated as varying shades of grey in FIG. 4) are filtered in the lower spatial frequencies and provide separable chroma radiance. In some embodiments, the example optical mask 50 may be designed to be "agile" such that a simple translation or rotation of the optical mask 50 results in a different set of simultaneous optically filtering patterns for encoding desired photon sub-beams 22. The encoding functions on which the example optical mask 50 is based are used computationally to reconstruct the filtered radiance of the encoded photon sub-beams 28 that are multiplexed (i.e., combined) in the combined photon beam 32 in the image plane at the detector 34.

Figure 5:
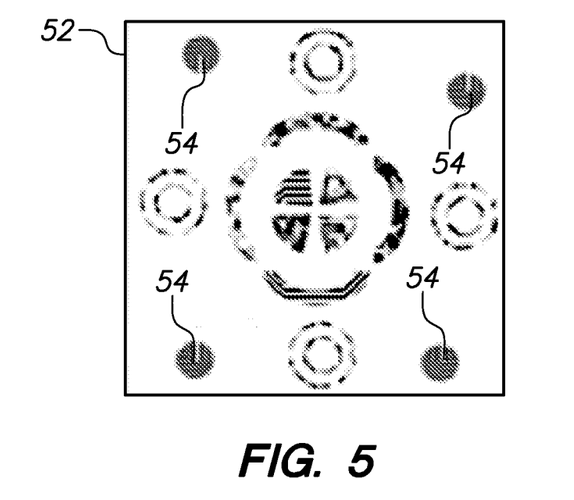
FIG. 5 illustrates an example optical mask according to another embodiment.

FIG. 5 illustrates an example optical mask 52 according to another embodiment. In this embodiment, the optical mask 52 includes one or more polarimetric filters 54 to encode one or more of the photon sub-beams 22 based, at least in part, on a polarization attribute of the photons 18.

Figure 6:
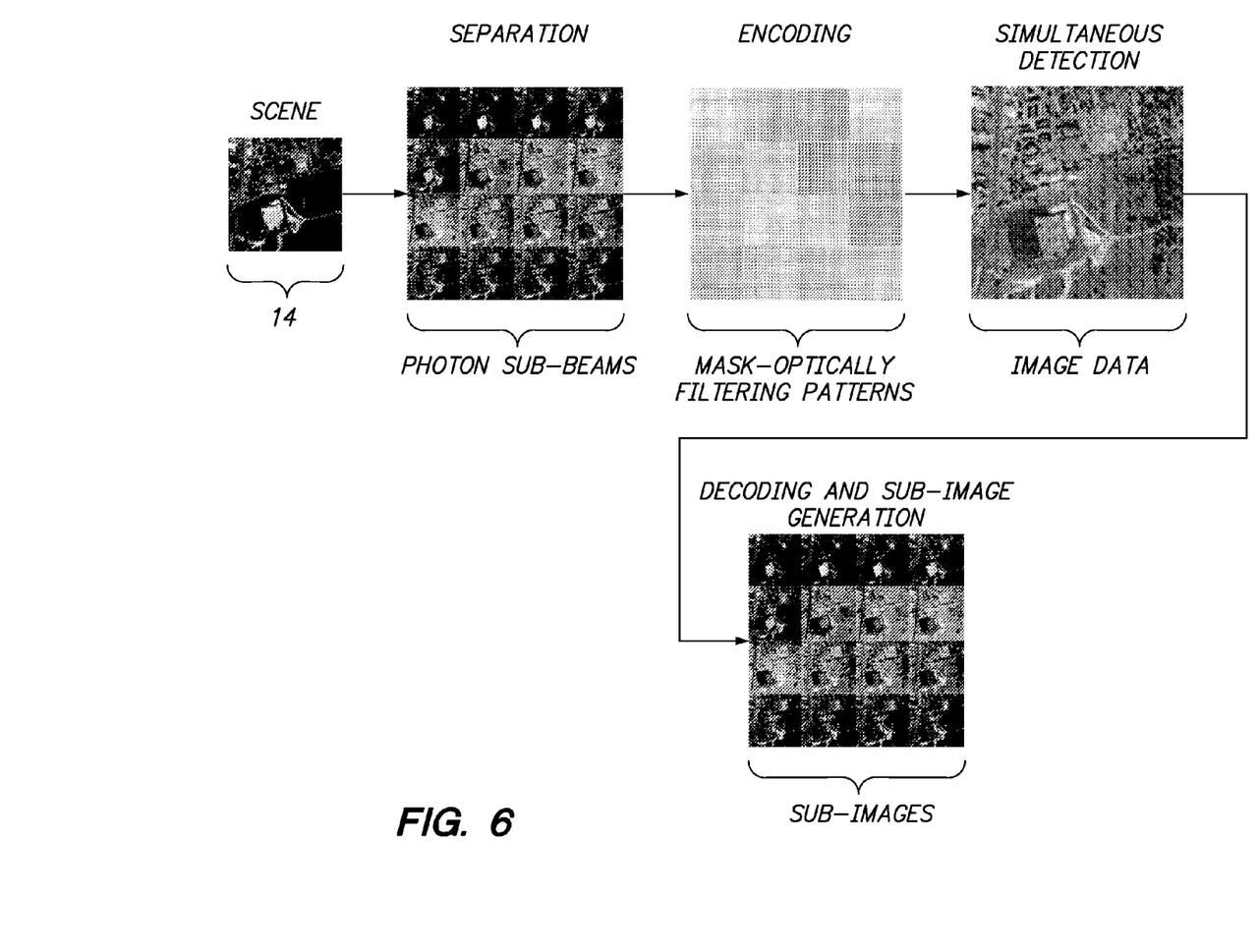
FIG. 6 illustrates a method for obtaining information from a scene according to one embodiment.

FIG. 6 illustrates a method for obtaining information from the scene 14 according to one embodiment. FIG. 6 will be discussed in conjunction with FIG. 1. The device 10 receives the photon beam 16 from the scene 14. The device 10 separates the photon beam 16 into sixteen photon sub-beams 22. Each of the photon sub-beams 22 includes photons associated with the scene 14 of a particular wavelength, or band, or wavelengths. The photon sub-beams 22 are then optically encoded by being passed through sixteen different encoding patterns by the encoder 26 to form sixteen encoded photon sub-beams 28. The encoded photon sub-beams 28 are combined and simultaneously detected at the detector 34, which generates the image data 36. The image data 36 is decoded based on the sixteen different encoding patterns to generate a plurality of sub-images 40.

Figure 7:
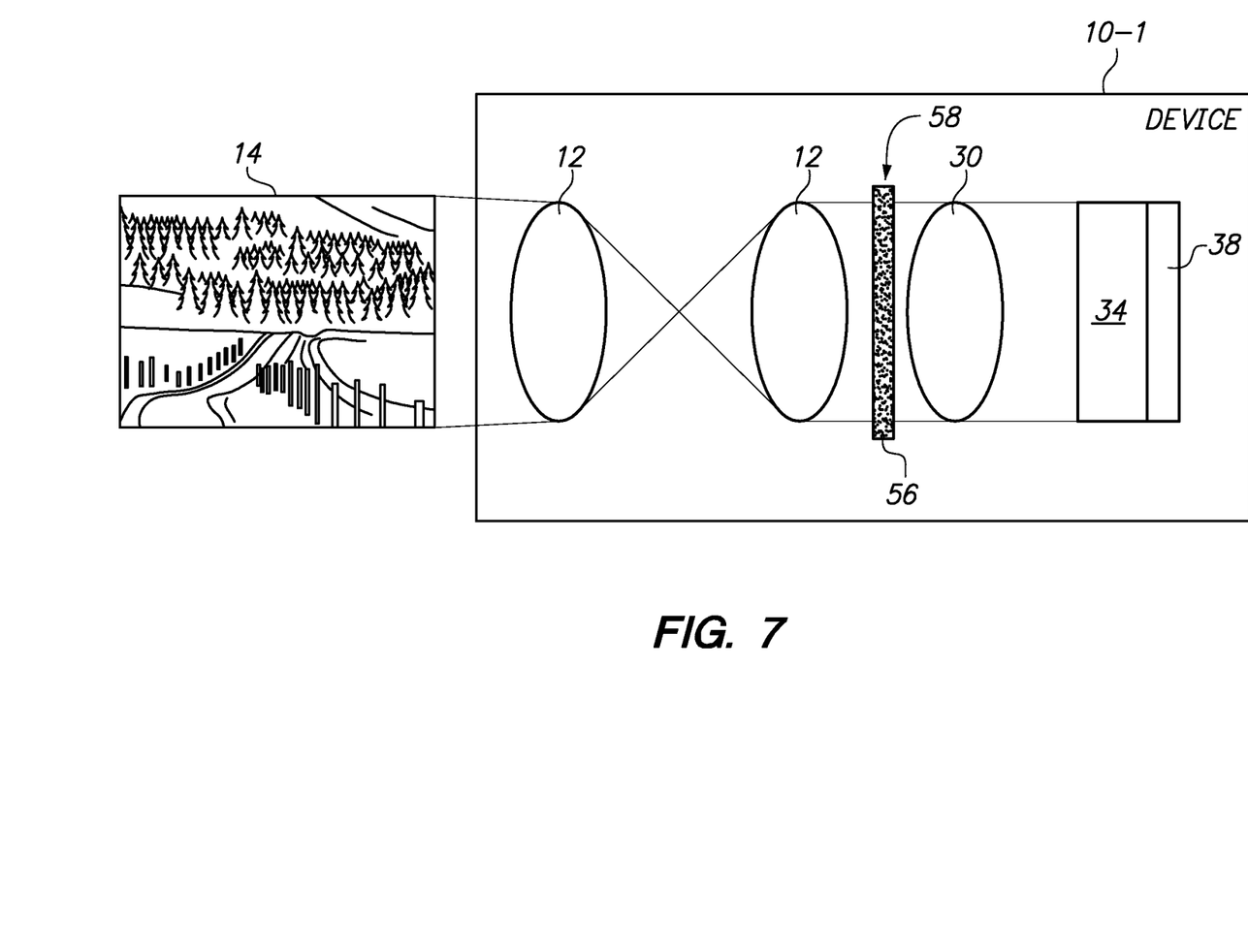
FIG. 7 is a block diagram of a device according to one embodiment.

FIG. 7 is a block diagram of a device 10-1 according to another embodiment. In this embodiment, a photon selector/encoder 56 is positioned at a collimated space such as a pupil plane 58. The photon selector/encoder 56, in one embodiment, may comprise a SLM. The photon selector/encoder 56 may filter on field angles such that the photon selector/encoder 56 subtends a subset of scene-filled angles. For a given pattern of the photon selector/encoder 56, the entire scene 14 may be filtered at the field angles. All filtered angle sets are optically relayed to the detector 34 in the image plane by a combiner 30, and detected simultaneously. The detector 34 generates image data 36 (not illustrated). Overlayed intensity variations implied by the filter pattern of the photon selector/encoder 56 may be used by the decoder 38 to generate sub-images 40 from the image data 36.

In one embodiment, the encoding functions may comprise different point spread functions (PSFs). Thus, at a collimated space such as the pupil plane 58, the photon selector/encoder 56 may comprise an optically filtering pattern that encodes different photon sub-beams 22 with different PSFs, using, for example, a dispersion color lateral lens, a binary optic lens, or a kinoform lens that is configured to extend axial color along the propagation axis. The optically filtering pattern may use phase shifts to apply a unique PSF for each photon sub-beam 22, where the PSF evolves with focus distance. Each encoded photon sub-beam 28 forms at the detector 34 with a different PSF. A particular encoded photon sub-beam 28 may be chosen to be focused at the detector 34 for proper image formation. The detector 34 simultaneously captures all encoded photon sub-beams 28, both focused and unfocused. The image detected at the detector 34 is a superposition of all encoded photon sub-beams 28, focused and unfocused, and may be considered as a cube of images with the spectral spread of focused images propagating along an optical axis, usually denoted as z. The sub-images 40 may be reconstructed based on the PSFs used to encode the encoded photon sub-beams 28.

Figure 8:
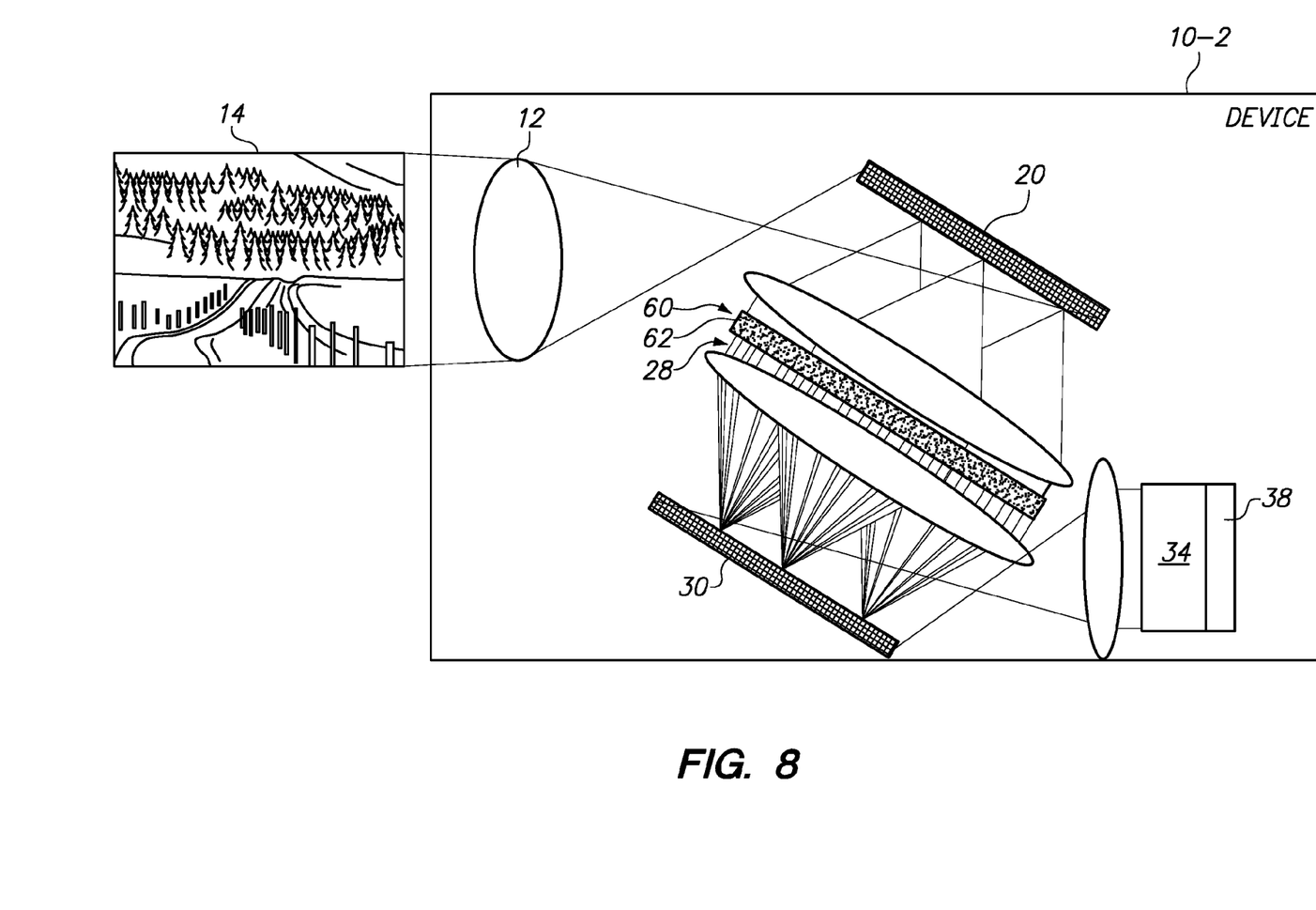
FIG. 8 is a block diagram of a device according to another embodiment.

FIG. 8 is a block diagram of a device 10-2 according to another embodiment. In this embodiment, the photon beam separator 20 is positioned at an image plane of the lens 12. The photon beam separator 20 provides a plurality of photon sub-beams 22 to a secondary image plane 60. A photon selector/encoder 62 positioned at the secondary image plane 60 selects certain photon sub-beams 22 and encodes the selected photon sub-beams 22 to generate encoded photon sub-beams 28. The encoded photon sub-beams 28 are combined by the combiner 30, and provided to the detector 34 for simultaneous detection, and for generation of the image data 36. The decoder 38 may generate sub-images 40 from the image data 36 based on the encoding functions used by the photon selector/encoder 62 to encode the encoded photon sub-beams 28.

Figure 9:
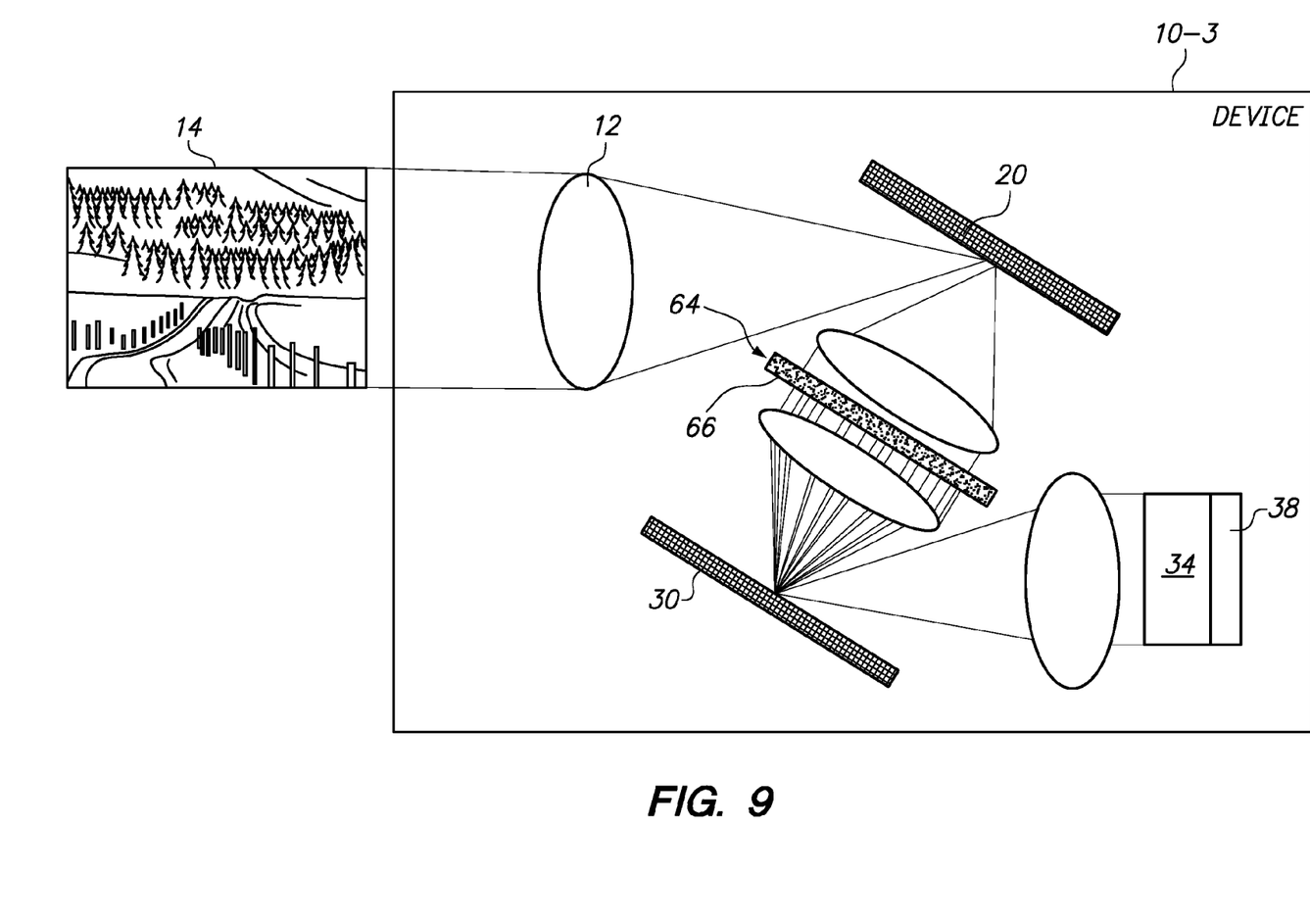
FIG. 9 is a block diagram of a device according to yet another embodiment.

FIG. 9 is a block diagram of a device 10-3 according to another embodiment. In this embodiment, the photon beam separator 20 is positioned at a focal plane of the lens 12. The photon beam separator 20 provides a plurality of photon sub-beams 22 to a secondary image plane 64. A photon selector/encoder 66 positioned at the secondary image plane 60 selects certain photon sub-beams 22 and encodes the selected photon sub-beams 22 to generate encoded photon sub-beams 28. The photon selector/encoder 66 may comprise, for example, a SLM. The encoded photon sub-beams 28 are combined by the combiner 30, and provided to the detector 34 for simultaneous detection, and for generation of the image data 36. The decoder 38 may generate sub-images 40 from the image data 36 based on the encoding functions used by the photon selector/encoder 62 to encode the encoded photon sub-beams 28. In one embodiment, the combiner 30 and the photon beam separator 20 may comprise a single element by the use of a mirror to reflect the encoded photon sub-beams 28 back to the photon beam separator 20, and separating, at that instance, the encoded photon sub-beams 28 from photon beams 16 being continuously received from the scene 14.

In one embodiment, the decoder 38 may utilize compressive sensing, which allows for the sampling of significantly fewer observations than the Shannon sampling theorem would normally permit. For a band-limited signal, with highest possible frequency $f_M$, the Shannon Theorem states that a signal must be sampled at a rate of at least two $2f_M$ for perfect signal reconstruction. Compressive sensing theorems have shown that, with modest additional assumptions, perfect signal reconstruction with far fewer samples than the Shannon Theorem implies is possible. Such assumptions include:

1. There is structure to the signal (i.e. the signal is not random). There exists a basis/dictionary for which the representation of the signal of interest is sparse, and the signal is compressible; and 2. The notion of "observing a sample" is generalized to include linear projections of the signal in addition to the instantaneous signal amplitude.

Assumption 1 is satisfied by almost all relevant signals, while assumption 2 is satisfied by assuming the existence of an analog device that can perform these projections during the sampling process. For example, assume that the underlying, high resolution, signal is given by F.

The basis/dictionary assumed under assumption 1, is represented by the matrix B.

Thus, assumption 1 states that F=Bα, for some sparse coefficient vector α. The projection samples in assumption 2 can be represented by a M×N "sampling" matrix P, where M<<N.

Each row of the matrix P represents a sampling of the underlying signal. This means only M samples of the signal information are taken, but previous theory implies the need for N samples. The compressed sensing equation becomes $$Y=PB\alpha \qquad (1)$$

where the observed signal samples are given in the M dimensional vector Y. To recreate the desired signal, the coefficient vector α is estimated. It has been shown that assumption 1, above, allows the estimation of the coefficients required for perfect signal reconstruction through the following optimization:

$$\alpha_{optimal}=\arg\min_\alpha \|\alpha\|_1 \text{ with } Y=PB\alpha \qquad (2).$$

In the context of hyperspectral imaging, for example, if encoded spectral information can be collected, then compressive sensing allows the reconstruction of an N×N×K hyperspectral image cube from a single Nx×N frame of encoded information.

For example, referring now to FIG. 6, if a spectral band m (i.e., a photon sub-beam 22) is passed through one of the optically filtering patterns illustrated in FIG. 6, in the image plane, then this (0, 1) mask can be represented as rows in the matrix P from Equation 1.

If several different spectral bands (i.e., several different photon sub-beams 22) are sent through different optically filtering patterns before being recombined onto the same FPA, then the resultant "pixel" information will be a different mixture of several different spectral bands being sensed by each detector element on the FPA. This process can be represented by a group of $N^2$ rows in the matrix P of equation 1 (one row per FPA detector element).

Using these fixed codes to define the "sampling" matrix P, the optimization of equation 2 is performed to reconstruct the N×N×K full resolution hyperspectral data cube.

A simple simulation experiment was conducted whereby a sixteen band spectral cube (first band represented by the scene 14 in FIG. 6) was encoded with different optically filtering patterns in the image plane before being recombined and sensed with a standard FPA.

Using a dictionary for the matrix B, the reconstruction algorithm was applied to this single frame of data (e.g., image data 36) to yield the full sixteen band spectral cube without loss of resolution, as illustrated in the sixteen sub-images shown in FIG. 6.

For spectral encodings that are applied in the Fourier plane of an imaging system, the results will be similar. For example, consider the encoding performed by the optical mask 50 illustrated in FIG. 4, applied in the Fourier plane of an imaging system. This implies that certain spatial frequencies of certain spectral bands will be filtered and that the FPA will output a similar grid of encoded measurements as the first example (i.e. each detector on the FPA will detect a different weighted combination of all the spectral bands of interest). Thus, a modeling of the encoding matrix P from equation 1 may be used to separate the different bands using the optimization of equation 2. The information is encoded in the Fourier plane, and thus a convolution is performed on the underlying image. Thus, instead of binary codes from the first example, the Fourier transform of the mask from FIG. 4, in each spectral band, is taken and a convolution matrix is formed. The convolution matrices form the essence of each row of the sampling matrix P from equation 1. Careful design of the encodings is preferred to perform the spectral un-mixing. For example, sufficient spatial frequencies of each spectral band are passed through the optics to realize the desired resolution, and also, there are incoherence requirements between the matrices in equation 1 for the optimization to guarantee image recovery.

In order to retain the desired spatial/spectral/temporal resolution, the optical systems are used to multiplex the spatial/spectral/temporal information with a linear code (either static or adaptive), implemented through the optical filters, which is optimized for certain imaging missions.

Thus, from the encoded data stream, the information can be de-multiplexed to reconstitute the full spatial/spectral/temporal scene information. Since the multiplexing codes are linear, a mathematical model of the system of linear equations should be formulated that relates the spatial/spectral/temporal scene information to the multiplexed information detected by the detector.

This results in an underdetermined set of equations which may be solved to retrieve the underlying scene being sensed. An underdetermined system of equations has infinitely many solutions, only one of which is the correct scene information. To find the "correct" solution to this set of equations there are two steps:

1. Using available exemplars of typical spatial/spectral phenomenon, these exemplars can be clustered into a basis or dictionary which can represent all the exemplars with as few coefficients as possible; and 2. Since the underlying scene is now represented with a sparse dictionary (or basis) the problem of identifying the correct solution out of the infinite possibilities can be resolved by selecting the solution which is the sparsest (i.e. has the least nonzero coefficients).

The adaptive multiplexing codes are designed so that they will optimally separate the components of the reconstruction dictionary.

In one embodiment, the sub-images 40 may be decoded using a least squares process. The following example decodes two sub-images 40 with different bandwidths from a single polychromatic (sensor) image data 36. The sensor image data 36 can be represented as the sum of the convolution of two images with different bandwidths. Mathematically, $$G(x,y)=\rho_1(x,y)*g_1(x,y)+\rho_2(x,y)*g_2(x,y), \qquad (1)$$

where $\rho_1$, $\rho_2$ are point spread functions (PSF), $g_1$, $g_2$ are functions that represent the sub-images 40 with different bandwidths, and G is the polychromatic image data 36 (measured by the detector 34).

The reconstruction of the sub-images 40 can be approximated using a linear model. The sub-images 40 can be represented numerically as a column vector. The sub-images 40 are maps from a plane to the real line. By sampling the image data 36 g(x, y) on the rectangular grid $$\mathcal{R}:\{(i,j):i=1,2,\ldots n, j=1,2,\ldots m\}$$

we obtain a matrix of the form $$\begin{pmatrix} g_1^1 & \cdots & g_m^1 \\ \vdots & \ddots & \vdots \\ g_1^n & \cdots & g_m^n \end{pmatrix}$$

where $g_j^i = g(i, j)$. The column vector f, which represents the image g on $\mathcal{R}$, is a column major decomposition defined as $$f := \begin{pmatrix} g_1^1 \\ \vdots \\ g_1^n \\ g_2^1 \\ \vdots \\ g_2^n \\ \vdots \\ g_m^1 \\ \vdots \\ g_m^n \end{pmatrix}.$$

Note that f lies on an n·m dimensional real vector space, i.e. $f \in \mathbb{R}^{n \cdot m}$.

Generally, the convolution of an image with a PSF, where $G = \rho * g$, is an image as well. This convoluted image can be approximated by applying a linear operator (a matrix) on an image (column vector), $F = pf$, where F is a column vector which approximates the convoluted image G, p is the linear operator corresponding to $\rho$, and f is the column vector approximation of the image g.

The structure of this linear operator, p, is similar to that of a toeplitz matrix. This linear operator is composed from entries of a PSF that is sampled on a rectangular grid. For example, let $$\rho = \begin{pmatrix} 1 & 4 & 7 \\ 2 & 5 & 8 \\ 3 & 6 & 9 \end{pmatrix}$$

be a PSF sampled on a rectangular 3×3 grid which operates on a 3×3 image. The image that is operated on belongs to a 9-dimensional space. The corresponding linear operator to $\rho$ is a 9×9 matrix given by $$p = \begin{pmatrix} 5 & 4 & 0 & 2 & 1 & 0 & 0 & 0 & 0 \\ 6 & 5 & 4 & 3 & 2 & 1 & 0 & 0 & 0 \\ 0 & 6 & 5 & 0 & 3 & 2 & 0 & 0 & 0 \\ 8 & 7 & 0 & 5 & 4 & 0 & 2 & 1 & 0 \\ 9 & 8 & 7 & 6 & 5 & 4 & 3 & 2 & 1 \\ 0 & 9 & 8 & 0 & 6 & 5 & 0 & 3 & 2 \\ 0 & 0 & 0 & 8 & 7 & 0 & 5 & 4 & 0 \\ 0 & 0 & 0 & 9 & 8 & 7 & 6 & 5 & 4 \\ 0 & 0 & 0 & 0 & 9 & 8 & 0 & 6 & 5 \end{pmatrix}.$$

Note that the entries of p are chosen to illustrate the pattern of the entries of $\rho$.

Let F be the column vector that approximates G. Let $f_1$ and $f_2$ be the column vector representations of the images $g_1$ and $g_2$, respectively. Finally, let $p_1$ and $p_2$ be the corresponding linear operators of the PSFs $\rho_1$ and $\rho_2$, respectively. Consequently, the linear model of (1) is $$F = p_1 f_1 + p_2 f_2.$$

The latter can be simplified by rewriting it as $$F = Pf, \quad (2)$$

where $P = [p_1 p_2]$ is the horizontal concatenation of the matrices $p_1$ and $p_2$, and $$f = \begin{bmatrix} f_1 \\ f_2 \end{bmatrix}$$

is the vertical concatenation of the column vectors $f_1$ and $f_2$.

The problem of reconstructing the sub-images 40 with different bandwidths from a polychromatic image data 36 is approximated by the linear model in (2).

The problem now becomes: given P and F, find a "least square approximation" $f_e$ to f. A typical solution $f_e$ is given by the formula $$f_e = R_f P^T (P R_f P^T)^{-1} F,$$

given that the matrix $P R_f P^T$ is invertible. Here, $R_f$ is the covariance matrix of images with two given bandwidths. More specifically, $$R_f = \frac{1}{N} \sum_{i=1}^{N} f_i f_i^T - \mu_f \mu_f^T, \quad (3)$$

where $\mu_f$ is the expected value of f. The sub-index of $f_i$ in (3) does not indicate the bandwidth, but denotes the i-th sample in the sample space of images structured as in (2).

In some embodiments, the photon selector 24 and encoder 26 may comprise a patterned optical plate. A plurality of different patterned optical plates with different optically filtering patterns may be generated, each such different patterned optical plate suitable for a particular mission. Based on the particular mission, the patterned optical plate suited for that mission may then be inserted into the device 10 for use during the mission, and subsequently removed, and another patterned optical plate inserted into the device 10 for another, different mission.

Those skilled in the art will recognize improvements and modifications to the preferred embodiments of the present disclosure. For example, the present embodiments are not limited to infrared or visible spectrum photon wavelengths, and have applicability in other wavelengths, including, for example photons of x-ray wavelengths. All such improvements and modifications are considered within the scope of the concepts disclosed herein and the claims that follow.

What is claimed is:

1. A method for obtaining information from a scene, comprising:
    separating a beam of photons associated with a scene into a plurality of photon sub-beams based on an attribute of the photons;
    optically encoding at least two photon sub-beams of the plurality of photon sub-beams by passing the at least two photon sub-beams through respective optically filtering patterns that correspond to respective encoding functions to generate at least two corresponding encoded photon sub-beams, the respective optically filtering patterns altering at least one of magnitude and phase of the at least two photon sub-beams;

optically combining the encoded photon sub-beams to generate a combined photon beam;

detecting, with a detection device, the combined photon beam for the generation of image data; and decoding the image data based on the plurality of encoding functions to generate a plurality of sub-images, each sub-image corresponding to one of the at least two photon sub-beams of the plurality of photon sub-beams.

2. The method of claim 1, wherein the beam of photons is separated by one of a dichroic spectral splitter, a field angle pupil optic, a wavelength beamsplitter, a phase beamsplitter, a polarization beamsplitter, a dispersive element, a pattern encoding optic, a pattern bandpass filter, a pattern phase shift filter, a binary optic lens, and a kinoform lens.

3. The method of claim 1, wherein the attribute comprises one of a wavelength attribute, a polarization attribute, and a phase attribute.

4. The method of claim 1, wherein detecting the combined photon beam comprises detecting simultaneously the at least two encoded photon sub-beams in the combined photon beam.

5. The method of claim 1, further comprising:
selecting the at least two photon sub-beams from the plurality of photon sub-beams; and
discarding other photon sub-beams of the plurality of photon sub-beams.

6. The method of claim 1, wherein optically encoding the at least two photon sub-beams of the plurality of photon sub-beams comprises simultaneously optically encoding the at least two photon sub-beams of the plurality of photon sub-beams.

7. The method of claim 1, wherein the plurality of encoding functions comprises a plurality of different point spread functions.

8. A device, comprising:
a photon beam separator configured to separate a beam of photons associated with a scene into a plurality of photon sub-beams based on an attribute of the photons;
an optical encoder configured to optically encode at least two photon sub-beams of the plurality of photon sub-beams by passing the at least two photon sub-beams through respective optically filtering patterns that correspond to respective encoding functions to generate at least two corresponding encoded photon sub-beams, wherein the respective optically filtering patterns are configured to alter at least one of a magnitude and phase of the at least two photon sub-beams;
an optical combiner configured to optically combine the encoded photon sub-beams to generate a combined photon beam;
a detector configured to detect the combined photon beam and to generate image data; and
a decoder configured to decode the image data based on the plurality encoding functions to generate a plurality of sub-images, each sub-image corresponding to one of the at least two photon sub-beams.

9. The device of claim 8, wherein the photon beam separator comprises one of a dichroic spectral splitter, a field angle pupil optic, a wavelength beamsplitter, a phase beamsplitter, a polarization beamsplitter, a dispersive element, a pattern encoding optic, a pattern bandpass filter, a pattern phase shift filter, a binary optic lens, and a kinoform lens.

10. The device of claim 8, wherein the attribute comprises one of a wavelength attribute, a polarization attribute, and a phase attribute.

11. The device of claim 8, wherein to detect the combined photon beam the detector is further configured to detect simultaneously the at least two encoded photon sub-beams in the combined photon beam.

12. The device of claim 8, further comprising:
a selector configured to:
select the at least two photon sub-beams from the plurality of photon sub-beams; and
discard other photon sub-beams of the plurality of photon sub-beams.

13. The device of claim 12, wherein the selector and the optical encoder comprise a spatial light modulator.

14. The device of claim 8, wherein to optically encode the at least two photon sub-beams of the plurality of photon sub-beams the optical encoder is configured to simultaneously optically encode the at least two photon sub-beams of the plurality of photon sub-beams.

15. The device of claim 8, wherein the plurality of encoding functions comprises a plurality of different point spread functions.

16. A device, comprising:
a photon beam separator configured to separate a beam of photons associated with a scene into a plurality of photon sub-beams based on an attribute of the photons;
an optical encoder configured to optically encode at least two photon sub-beams of the plurality of photon sub-beams to generate at least two corresponding encoded photon sub-beams by passing the at least two photon sub-beams through respective optically filtering patterns that correspond to encoding functions of a plurality of encoding functions, each encoded photon sub-beam encoded based on the corresponding encoding function of the plurality of encoding functions;
an optical combiner configured to optically combine the encoded photon sub-beams to generate a combined photon beam;
a detector configured to detect the combined photon beam and to generate image data; and
a decoder configured to decode the image data based on the plurality of encoding functions to generate a plurality of sub-images, each sub-image corresponding to one of the at least two photon sub-beams.

* * * * *